United States Patent
Buyukkoc et al.

(10) Patent No.: US 6,788,672 B1
(45) Date of Patent: Sep. 7, 2004

(54) METHOD AND APPARATUS FOR TELEPHONE MESSAGING

(75) Inventors: Cagatay Buyukkoc, Holmdel, NJ (US); Michael B. Jones, Florham Park, NJ (US); David Hilton Shur, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/842,591

(22) Filed: Apr. 15, 1997

(51) Int. Cl.[7] .............................................. H04L 12/56
(52) U.S. Cl. ..................................... 370/352; 370/401
(58) Field of Search ................................ 370/352, 353, 370/354, 355, 401, 408, 410; 395/200.57, 200.58, 200.68, 200.74, 200.75

(56) References Cited

U.S. PATENT DOCUMENTS

| | | | | |
|---|---|---|---|---|
| 5,608,786 A | * | 3/1997 | Gordon ....................... | 379/100 |
| 5,635,918 A | * | 6/1997 | Tett ........................ | 340/825.52 |
| 5,883,891 A | * | 3/1999 | Williams et al. ............ | 370/356 |
| 5,884,262 A | * | 3/1999 | Wise et al. .................. | 704/270 |
| 5,943,398 A | * | 8/1999 | Klein et al. ............... | 379/88.13 |
| 6,069,890 A | * | 5/2000 | White et al. ................. | 370/352 |
| 6,426,955 B1 | * | 7/2002 | Gossett Dalton, Jr. et al. .. | 370/401 |

OTHER PUBLICATIONS

J.G. Miller et al: *Accessing Messages Your Way AT7T* Technology, vol. 10, No. 1, Mar. 21, 1995, pp. 6–9.

* cited by examiner

*Primary Examiner*—Kenneth Vanderpuye

(57) ABSTRACT

A method and apparatus for telephony messaging based on a network of packet telephony messaging (PTM) servers. A message is received at an originating PTM server from an originator for delivery to a target device for a recipient. The message is stored at the originating PTM server. The message is routed from the originating PTM server (possibly via a second and subsequent PTM servers) over a first network to a destination PTM server located near the target device. The recipient is notified of the message by the destination PTM server. The message is delivered to the target device from the second PTM server over a second network in response to a request by the recipient.

8 Claims, 9 Drawing Sheets

METHOD AND APPARATUS FOR TELEPHONE MESSAGING

FIELD OF THE INVENTION

The invention relates to a messaging system. More particularly, the invention relates to a Packet Telephony Messaging (PTM) scheme for telephone and personal computer (PC) messaging.

BACKGROUND OF THE INVENTION

Currently, many countries charge differing rates for international phone calls. In fact, in some instances these rates can be dramatically different. For example, an international call between two parties located in Japan and the United States can be much more expensive if the call originates in Japan rather than the United States.

As a result, several products have been developed that permit users to originate international phone calls in the country offering lower international call rates. In essence, these products permit a first user to send a message to a second user indicating that the second user should "call-back" the first user. These products are generally referred to as "call-back messaging" (CBM) devices.

Conventional CBM devices utilize existing circuit-switched networks to send call-back messages. Typically, a first party would dial a number from a first country to a second party in a second country, with the number uniquely identifying the second party. The call-back messaging device would then automatically initiate a new call originating in the second country from the second user back to the first user in the first country. The new call would typically utilize the same network which was used to send the initial call-back message.

These call-back messaging devices, however, are unsatisfactory for a number of reasons. For example, in many instances a call-back message would be sent without the first user incurring any calling costs, sometimes in violation of regulations promulgated by the Federal Communications Commission (FCC). This would be accomplished using techniques such as "in-band-signaling" and implied messaging. These devices would use direct inward dialing (DID) and an unanswered call to trigger dial-back capabilities, thereby avoiding any charges being assessed by the telephone service provider in the country that initiated the call-back message.

In addition to potentially violating FCC regulations, conventional CBM devices lack robustness. These devices are capable of delivering messages only to a telephone, and not other terminal devices such as a facsimile machine, voice mail service, answering machine, pager and so forth. Further, these devices are limited in terms of the type of call-back messages they could deliver, often relying upon a simple ringing sound at the recipient's telephone set.

In view of the foregoing, it can be appreciated that a substantial need exists for a new messaging device which solves the above-discussed problems.

SUMMARY OF THE INVENTION

These needs and other needs are met by a method and apparatus for telephony messaging based on a network of packet telephony messaging (PTM) servers. A message is received at an originating PTM server from an originator for delivery to a target device for a recipient. The message is stored at the originating PTM server. The message is routed from the originating PTM server (possibly via a second and subsequent PTM servers) over a first network to a destination PTM server located near the target device. The recipient is notified of the message by the destination PTM server. The message is delivered to the target device from the destination PTM server over the second network in response to a request by the recipient.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention includes a Packet Telephony Messaging (PTM) method and apparatus for telephony messaging. Many packet technologies may be utilized with the present invention, including an Internet Protocol (IP), X.25, System Network Architecture (SNA), Frame Relay, Asynchronous Transfer Mode (ATM), and so forth.

An advantageous embodiment of the invention uses an Internet Protocol (IP) network ("Internet") for telephony messaging. This embodiment of the invention is referred to as Internet Packet Telephony Messaging (IPTM). IPTM uses the Internet as a parallel channel for the delivery of signals or prompts for circuit switched telephony or for the delivery of messages. Previously, many CBM devices used the in-band signaling method of uncompleted calls for call-back messaging between two countries. IPTM uses an out-of-band signaling approach for a message to be delivered from user A to user B via a packet-switched data network for a response from user B to user A on a circuit switched telephony network.

IPTM operates as follows. Subscriber A generates a message on an IPTM form using a personal computer (PC), telephone, personal digital assistant (PDA), or other input device. The message is sent through access provided by the local Internet Service Provider (ISP). Routing of this form to the destination IPTM server is done using the IP network. The destination IPTM server is calculated based on the destination telephone number and the closest IPTM server to the destination. Once the form is delivered, the destination IPTM server converts the contents of the form into a delivery (e.g., text, audio, etc.) message and delivers it to the destination telephone number (e.g., telephone, facsimile machine, beeper, etc.) by placing a local call informing the called party of the number.

Figure 1:
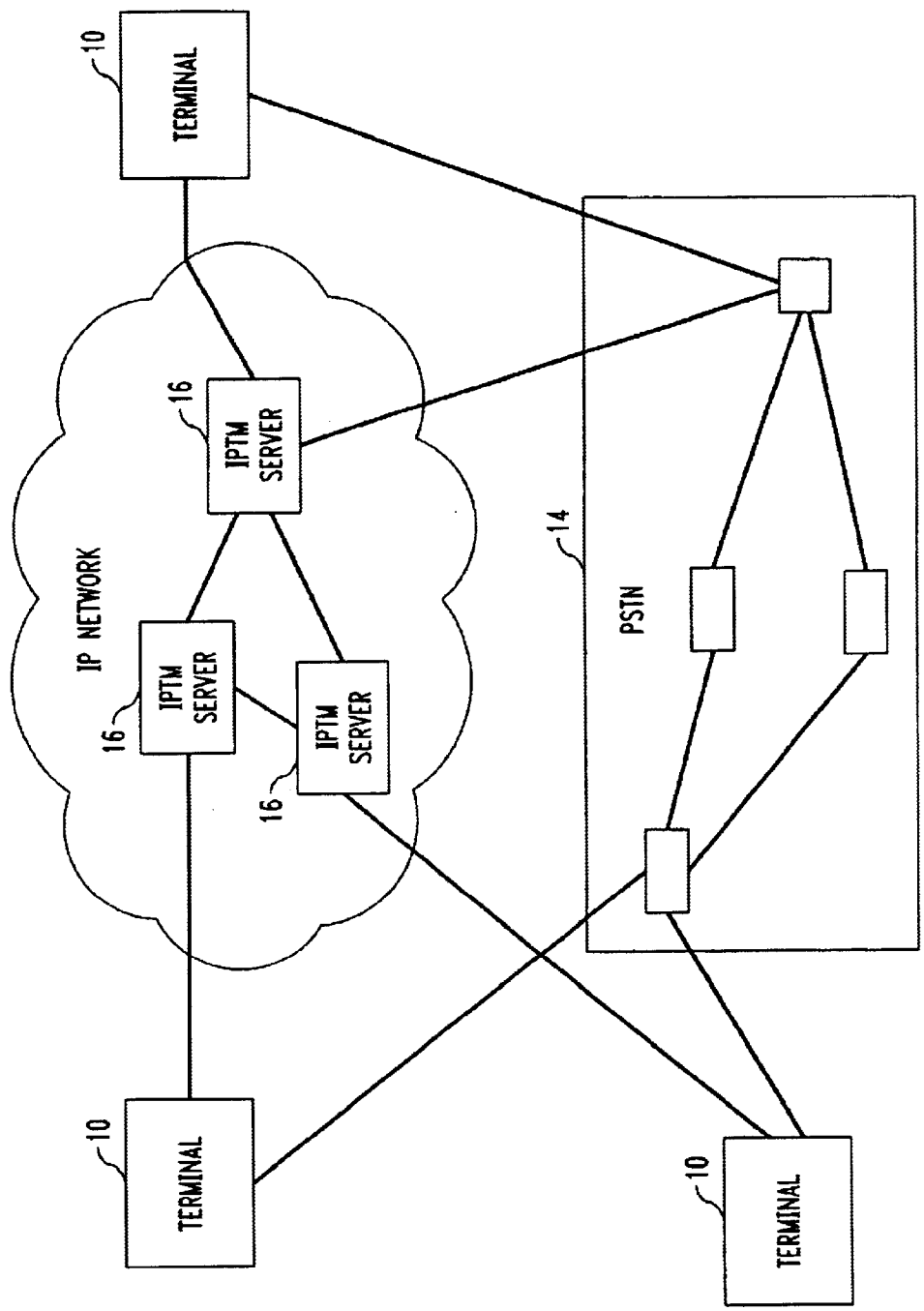
FIG. 1 is a diagram of an Internet access service system and public switched telephone system (PSTN) which are suitable to practice the present invention.

Referring now in detail to the drawings wherein like parts are designated by like reference numerals throughout, there is illustrated in FIG. 1 a diagram of an Internet access service system and public switched telephone system (PSTN) which are suitable to practice the present invention. FIG. 1 shows an IPTM terminal 10 connected to IP network 12. IP network 12 is a packet-switched network utilizing the Internet protocol. IP network 12 is used to transport an IPTM message from user A to user B. IP network 10 includes multiple servers providing IPTM functions, which are referred to as IPTM servers 16.

IPTM terminal 10 may also be connected to telephony network 14. Alternatively, the users of terminal 10 may have a separate telephony device, e.g., a telephone connected to telephony network 14. Telephony network 14 is a circuit-switched network used to carry primarily voice traffic, one example of which is the PSTN. Telephony network 14 is used by user B to respond to user A in response to the IPTM message delivered via IP network 12.

IPTM terminal 10 refers to a number of potential communications devices for originating and receiving messages, as well as providing real-time voice communications. For example, IPTM terminal 10 includes personal computers (PC), network PCS, consumer Internet appliances, residential or business phones, portable telephones, transportable phones, car telephones, hand-held telephones, pocket telephones, pagers, personal computers (PC), laptop computers, notebook computers, facsimile machines, personal information managers, personal digital assistant (PDA), and so forth.

In one embodiment of the invention, IPTM terminal 10 includes a standard personal computer (PC) equipped with a network interface card for interfacing with a packet-switched network, and a software browser for retrieving information over the Internet and World Wide Web (WWW). The keyboard of the PC is used to fill out an IPTM form stored in IPTM server 16. The information inputted into the IPTM form is used to create an IPTM message. IPTM terminal 10 also includes a telephone connected to telephony network 14 for real-time voice communications, i.e., for user B to call back and speak with user A in response to the IPTM message from user A. Alternatively, an IPTM form could also be completed using a telephone.>

Figure 2:
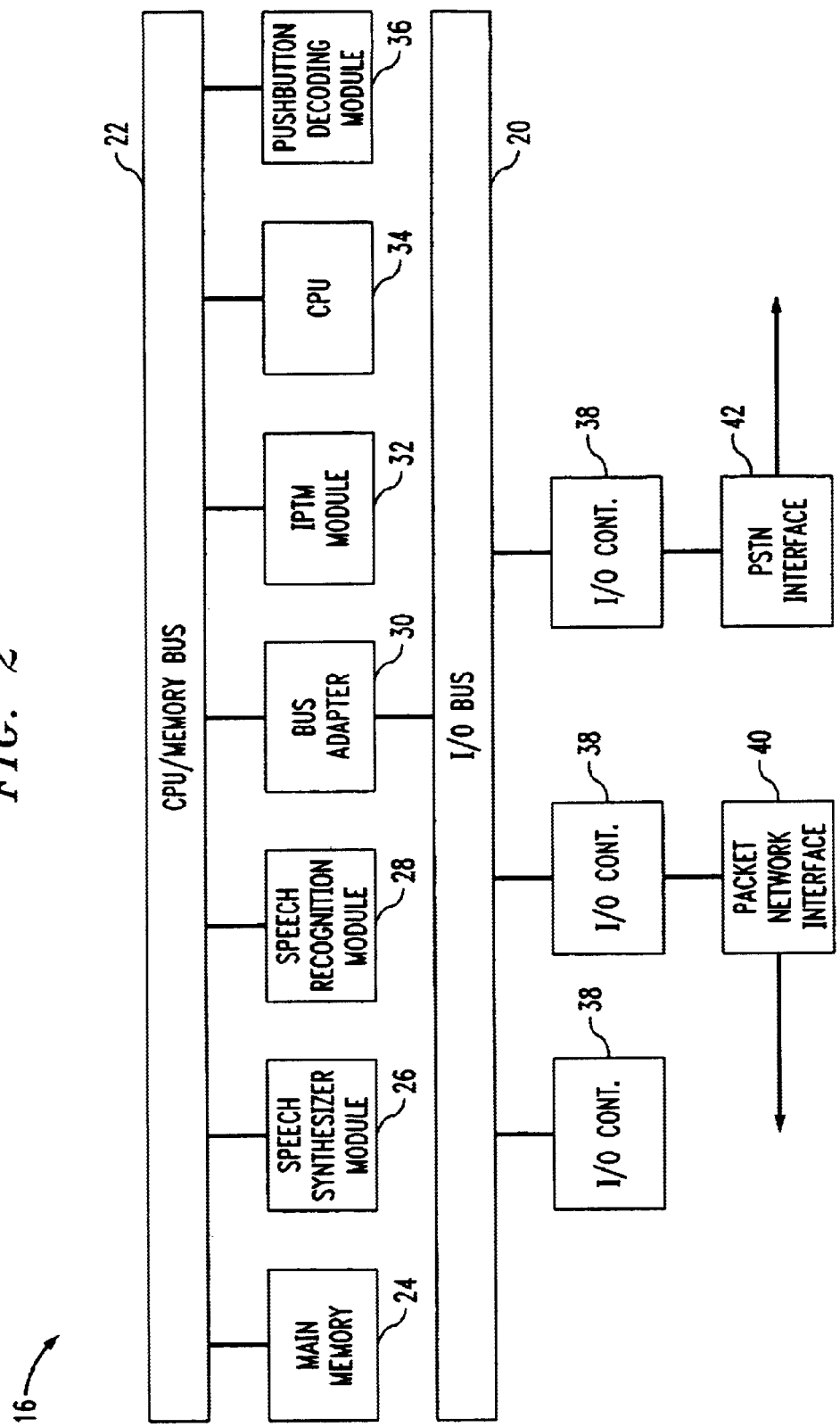
FIG. 2 is a block diagram of an Internet Packet Telephony Messaging (IPTM) server in accordance with one embodiment of the invention.

FIG. 2 is a block diagram of an IPTM server in accordance with one embodiment of the invention. The IPTM server 16 communicates with IP network 12 through a communications link. The IPTM server 16 comprises a main memory module 24, a speech synthesizer 26, a speech recognition module 28, a bus adapter 30, an IPTM application module 32, a central processing unit (CPU) 34, and a push button decoding module 36, each of which is connected to a central processing unit (CPU)/memory bus 22 and an Input/Output (I/O) bus 20 via bus adapter 30 as shown in FIG. 2. Further, the IPTM server 16 contains multiple I/O controllers 38, packet network interface 40, and PSTN interface 42, each of which is connected to I/O bus 20.

The overall functioning of IPTM server 16 is controlled by CPU 34, which operates under control of executed computer program instructions that are stored in main memory 24. Main memory 24 may be any type of machine readable storage device, such as random access memory (RAM), read only memory (ROM), programmable read only memory (PROM), erasable programmable read only memory (EPROM), electronically erasable programmable read only memory (EEPROM), magnetic storage media (i.e., a magnetic disk), or optical storage media (i.e., a CD-ROM). Further, IPTM server 16 may contain various combinations of machine readable storage devices through other I/O controllers, which are accessible by CPU 34, and which are capable of storing a combination of computer program instructions and data.

Speech synthesizer 26 performs speech synthesis of the text based elements in the IPTM form, such as originating user, originating phone number, message body, and so forth. These text elements are converted to an audible file which is delivered to a target device for the recipient of the IPTM message. The text-to-speech synthesizing is accomplished using techniques well-known in the art.

Speech recognition module 28 performs speech recognition of speech signals and received over CPU/memory bus 22. Such speech signals are processed and converted into digital data by speech recognition module 28, using techniques well-known in the art.

Bus adapter 30 is used for transferring data back and forth between the CPU/memory bus 22 and I/O bus 20.

IPTM application module 32 is used to create and send the IPTM message from user A to user B. On the origination side (from user A), IPTM application module 32 prompts the user to fill in an IPTM form 41 (discussed in further detail with reference to FIG. 3). On the receiving side (to user B), IPTM application module 32 sends instructions to PSTN interface 42 for placing a local call to the recipient's IPTM terminal 10 for receiving the IPTM message.

CPU 34 includes any processor of sufficient processing power to perform the IPTM functionality found in IPTM server 16. Examples of CPUs suitable to practice the invention includes the Intel family of processors, such as the Pentium™ and Pentium Pro™ microprocessors.

Push button decoding module 36 is used to interpret push button commands using a standard or modified telephone keypad in response to prompts generated by IPTM application module 32.

It is noted that each module 26, 28, 32 and 36 is shown as a separate functional module in FIG. 2. The functionality of each of modules 26, 28, 32 and 36 may be implemented in hardware, software, or a combination of hardware and software, using well known signal processing techniques.

The functioning of each of these modules will be described in further detail below in conjunction with the example discussed below.

Packet network interface 40 is used for communications between IPTM server 16 and IPTM terminal 10, as well as connecting IPTM server 16 to a packet network, such as IP network 12. Interfaces to other packet networks such as X.25 is also possible.

PSTN interface module 42 is used for communications between IPTM server 16 to a telephone network, such as telephony network 14, or a private personal communications services (PCS) network or paging network.

I/O controllers 38 are used to control the flow of information between IPTM server 16 and external devices or networks such as terminal 10, IP network 12, and PSTN 14.

Figure 3:
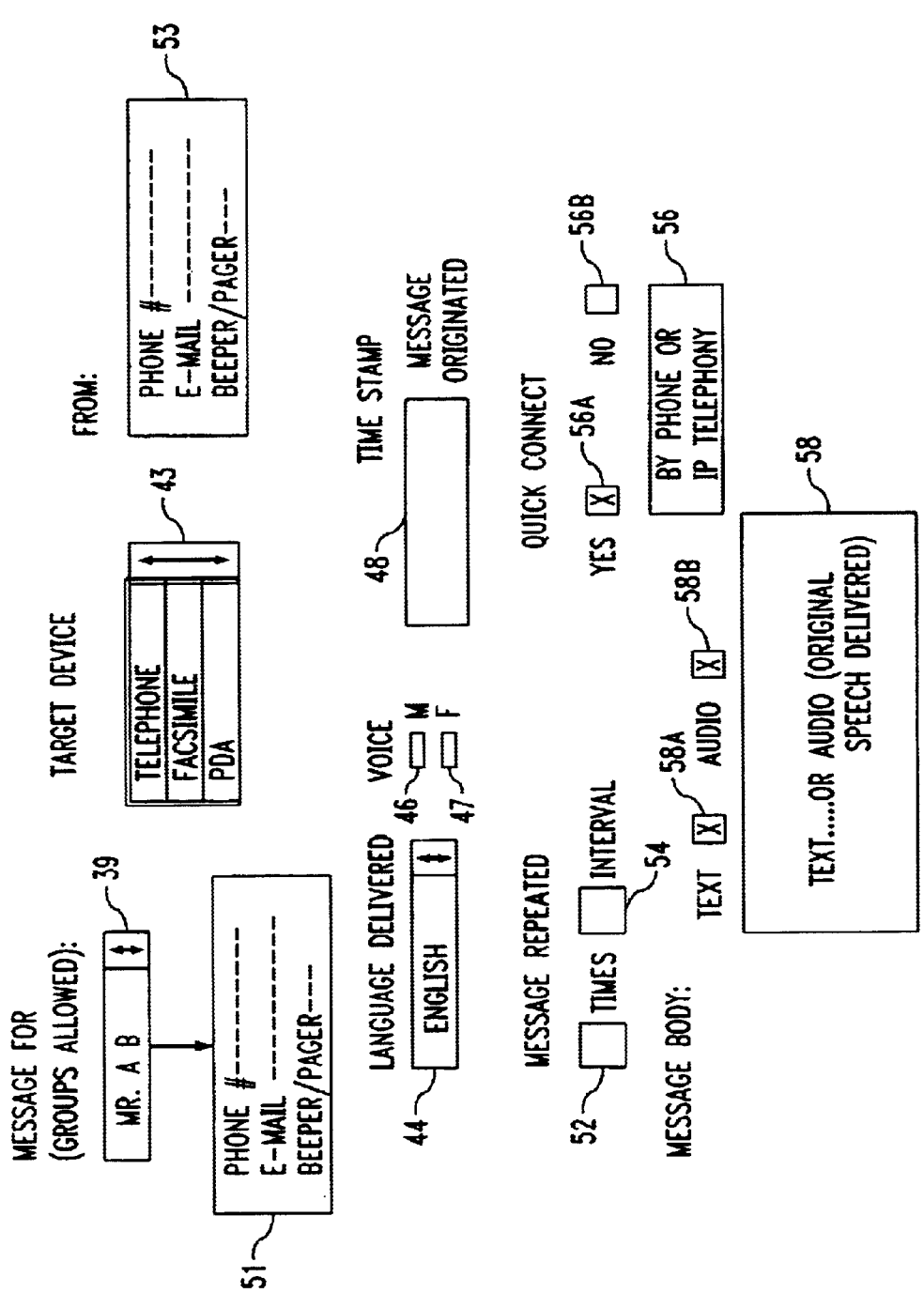
FIG. 3 is an example of a IPTM form used to create a call-back message in accordance with one embodiment of the invention.

FIG. 3 is an example of an IPTM form used to create an IPTM message in accordance with one embodiment of the invention. FIG. 3 shows an IPTM form 41 for generating an IPTM message. Block 39 identifies the recipient for the IPTM message. Block 51 is for inputting the recipient's e-mail address, phone number and pager/beeper address. Block 43 is for selecting a target device to which the IPTM message will be delivered. Target devices include those same devices listed for terminal 10, such as personal computers (PC), network PCS, consumer Internet appliances, residential or business phones, portable telephones, transportable phones, car telephones, hand-held telephones, pocket telephones, pagers, personal computers (PC), laptop computers, notebook computers, facsimile machines, personal information managers, personal digital assistant (PDA), and so forth.

Selecting a target device will automatically initiate a search for a destination address for the target device using a telephony to e-mail address mapping algorithm (TEMA) described below. Block 53 is used to input the originator's e-mail address, phone number and pager/beeper address. Block 44 designates the language used to deliver the IPTM message. Blocks 46 and 47 are used to designate a male or female voice for delivering the IPTM message, respectively. Block 48 is used for record keeping purposes. Block 48 provides a time stamp for when the message was originated. Block 52 indicates the number of times the message is to be repeated if the target device is busy, and block 54 indicates the time interval between repeated messages. Block 56 implements a bridging function for a voice call between the sender and the recipient. The term "bridging" as used herein refers to the connection of the originating and receiving parties while one or both parties are still connected to the IPTM system. Whether the voice call should be carried via the PSTN or IP telephony is controlled using blocks 56A and 56B. Block 58 is used for the originating user to place the actual message body for the recipient, where it can be presented as text by marking button 58A, or audio by marking button 58B, or both.

It can be appreciated that although IPTM form 41 shows specific elements used to create the IPTM message, any number of element combinations or additional elements fall within the scope of the invention.

Figure 4:
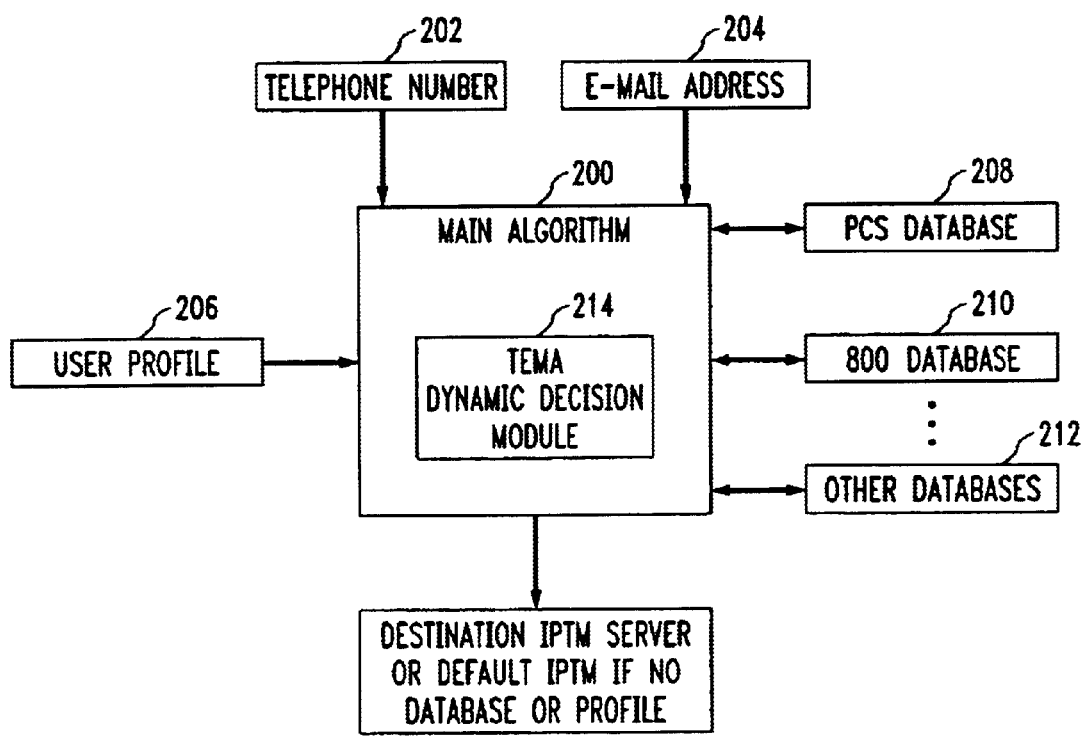
FIG. 4 is a block diagram of a telephone to e-mail mapping algorithm (TEMA) in accordance with one embodiment of the invention.

FIG. 4 is a block diagram of a TEMA in accordance with one embodiment of the invention. Once a user fills in an IPTM form and selects a recipient and target device, TEMA calculates a destination IPTM server to deliver the IPTM message to the target device. By doing so, TEMA permits users to receive an IPTM message conveniently and reliably, while at the same time keeping costs associated with the transport of the IPTM message as low as possible. IPTM services use a packet-based network such as the Internet to deliver the IPTM message to a server near the target device of the recipient. The target device is then accessed using a local telephone number, thereby minimizing telephony charges.

TEMA locates destination telephone numbers and corresponding destination IPTM servers using a TEMA main algorithm module 200. TEMA module 200 accepts as inputs a telephone number 202 and/or e-mail address 204 for the recipient. TEMA module 200 also accesses an IPTM user profile 206 for the recipient, and performs searches of various databases, such as a personal communications services (PCS) database 208, an 800 database 210, and other databases 212 providing information regarding the recipient and the location of the target device. This information is used by a TEMA dynamic decision module 214 to determine "an appropriate" destination IPTM server to connect to the target device for the recipient, or a default IPTM server stored in a lookup table if no information regarding the location of the target device is available. A set of rules can be used for this measure of "appropriateness", i.e., physical proximity, balancing the load on IPTM servers, and so forth. As a result, TEMA ensures that the appropriate IPTM server on IP network 12 will receive the message. In this embodiment of the invention, the measure of "appropriateness" is the physical proximity of the IPTM server to the target device of the recipient.

Figure 5A:
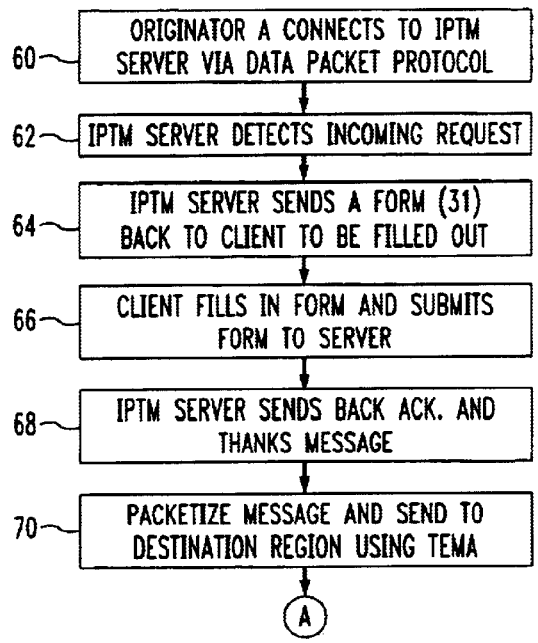
FIG. 5(A) is a first block flow diagram of a method for implementing IPTM in accordance with a first embodiment of the invention.

FIG. 5(A) is a first block flow diagram of a method for implementing IPTM in accordance with a first embodiment of the invention. This embodiment of the invention uses a PC to generate the IPTM message for delivery to a telephone, e.g., residential telephone, office telephone, mobile telephone, and so forth.

As shown in FIG. 5(A), an originating user ("originator") accesses IP network 12 using the PC of IPTM terminal 10 and a data packet protocol, and connects to IPTM server 16 at step 60. The originator requests IPTM service from IPTM server 16 via IPTM application module 32. IPTM server 16 detects the incoming request at step 62. IPTM application module 32 presents an IPTM form 41 to the originator for generating an IPTM message to a receiving user ("recipient") at step 64.

Once IPTM form 41 is filled in by the originator, it is submitted to IPTM server 16 at step 66. IPTM application module 32 sends back an acknowledgment and thank you message to the originator at terminal 10 at step 68. At step 70, IPTM application module 32 sends IPTM form 41 to a destination region determined using TEMA. IPTM form 41 can be sent over the network using any well-known technique in the art, such as e-mail with a Multipurpose Internet Mail Extension (MIME) attachment via packet network interface 40 and the Internet transmission control protocol (TCP) to a destination IPTM using TEMA.

Figure 5B:
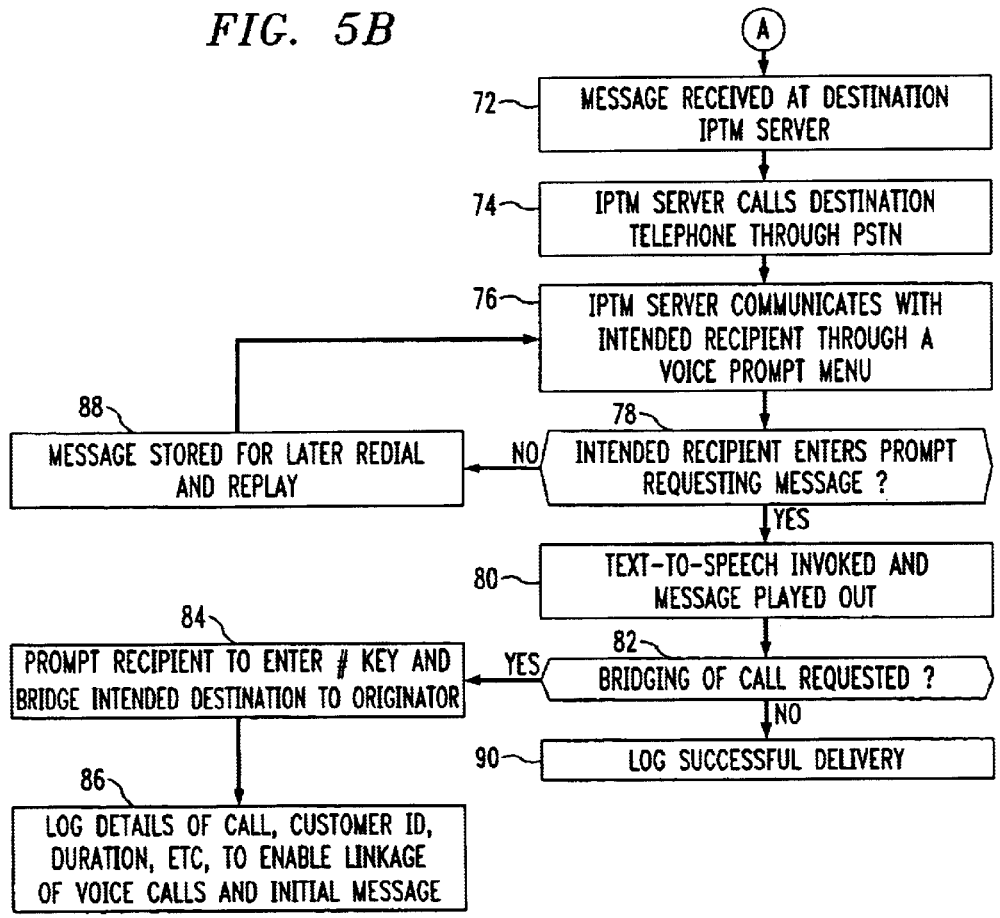
FIG. 5(B) is a second block flow diagram of a method for implementing IPTM in accordance with a first embodiment of the invention.

FIG. 5(B) is a second block flow diagram of a method for implementing IPTM in accordance with a first embodiment of the invention. Once the destination IPTM server is located using TEMA, the IPTM form is delivered via IP network 12 at step 72. At step 74, the destination IPTM server 16 calls the telephone number for the recipient using the local telephone company servicing the recipient's area. At step 76, the destination IPTM server 16 communicates with the recipient through a voice prompt menu presented in the appropriate language. Responses by the user are detected by the destination IPTM server 16 using push button decoding module 36 or speech recognition module 28. If the recipient does not desire to listen to the message immediately at step 78, the IPTM message is stored for later redial and replay at step 88.

If the recipient does desire to listen to the message immediately at step 78, the recipient enters a prompt requesting the IPTM message, and IPTM server 16 converts the contents of the IPTM form into an audio message using speech synthesizer 26, and plays the audio message for the recipient at step 80. Any requested language translation is also implemented during the text-to-speech conversion process.

The recipient can then select whether he or she wishes to bridge with the originator of the IPTM message at step 82. If the recipient does not desire to bridge with originator, the IPTM message is logged by the system as successfully delivered at step 90. If the recipient does desire to bridge with the originating caller at step 82, the voice prompt menu prompts the recipient to press the "#" key to bridge the recipient with the originator at step 84. Call reporting details for the call, such as customer identification numbers, duration of the phone call, and so forth, are logged to enable linkage of voice calls and the original IPTM message at step 86.

Figure 6A:
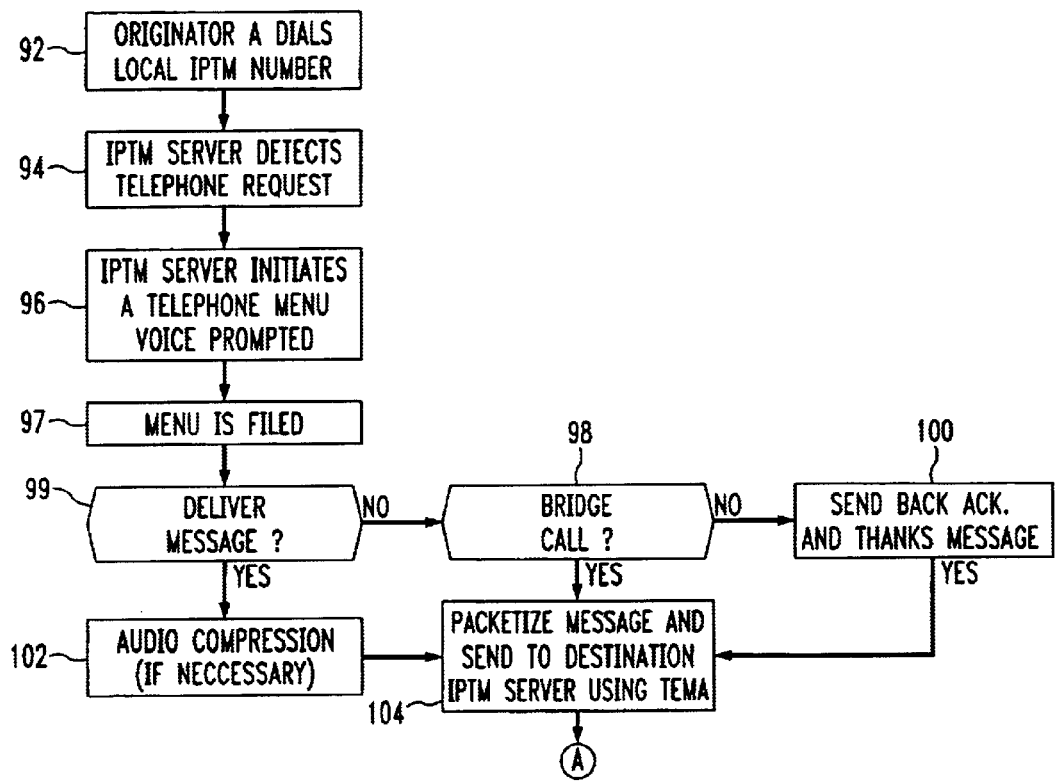
FIG. 6(A) is a first block flow diagram for a method for implementing IPTM in accordance with a second embodiment of the invention.

FIG. 6(A) is a first block diagram for a method for implementing IPTM in accordance with a second embodiment of the invention. This embodiment of the invention uses a telephone to generate the IPTM message for delivery to another telephone.

As shown in FIG. 6(A), The originator dials a local IPTM telephone number at step 92. An IPTM server detects a telephone request at step 94. The IPTM server 16 initiates a voice prompted menu to complete the IPTM form over the telephone at step 96, described in more detail with reference to FIG. 3. The originator fills in the voice prompted menu at step 97. The originator is also given the option of recording a voice message for the recipient if desired at step 99. If a message is recorded at step 99, audio compression is performed at step 102. Audio compression/decompression can be accomplished using any well-known technique in the art. At step 104, the IPTM message is packetized and sent via IP network 12 to the destination region of the recipient that is located using TEMA.

If no message is recorded at step 99, the originator is prompted as to whether he or she would like the call to be bridged at step 98. If the originator would like to bridge with the recipient at step 98, step 104 is performed. If the originator would not like to bridge with the recipient at step 98, IPTM application module 32 sends back an acknowledgment and thank you message to the originator at step 100 prior to completing step 104.

Figure 6B:
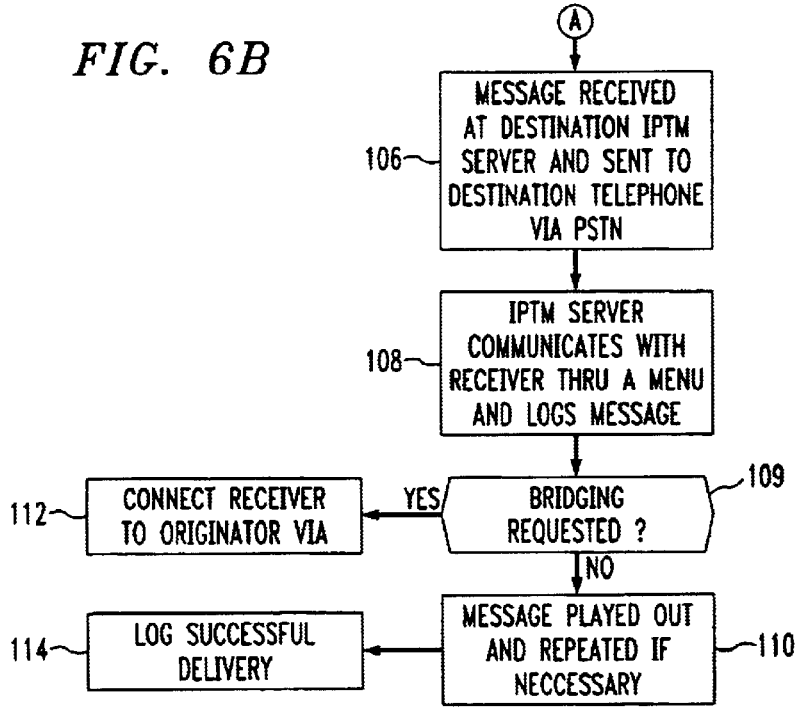
FIG. 6(B) is a second block flow diagram for a method for implementing IPTM in accordance with a second embodiment of the invention.

FIG. 6(B) is a second block diagram for a method for implementing IPTM in accordance with a second embodiment of the invention. Once the destination IPTM server is located using TEMA, the IPTM message is delivered via IP network 12 to the a destination IPTM server 16 at step 106. At step 106, the destination IPTM server 16 also calls the telephone number for the recipient using a local network such as that provided by a telephone company servicing the recipient's area, a private PCS network, or a pager network. At step 108, the destination IPTM server 16 communicates with the recipient through a voice prompt menu presented in the appropriate language. Responses by the user are detected by the destination IPTM server 16 using push button decoding module 36 or speech recognition module 28. The IPTM message is also logged at step 108.

At step 109 a determination is made as to whether bridging has been requested by the originator. If bridging has been requested, the recipient is connected to the originator at step 112. If bridging has not been requested, and the recipient desires to listen to the message, the recipient enters a prompt requesting the IPTM message, and IPTM server 16 converts the contents of the IPTM form into an audio message using speech synthesizer 26, and plays the audio message for the recipient at step 110. Any requested language translation is also implemented during the text-to-speech conversion process. Once the message has been delivered to the recipient, the IPTM message is logged as having been successfully delivered at step 114.

Figure 7A:
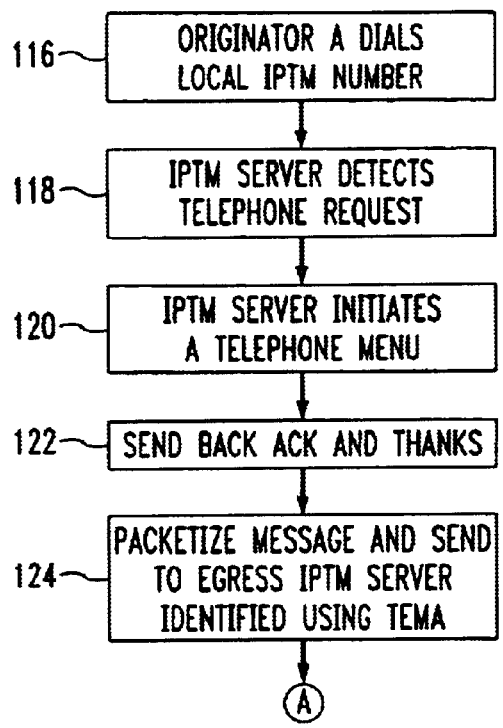
FIG. 7(A) is a first block flow diagram of a method for implementing IPTM in accordance with a third embodiment of the invention.

FIG. 7(A) is a first block flow diagram of a method for implementing IPTM in accordance with a third embodiment of the invention. In this embodiment of the invention a telephone is used to generate an IPTM message to a pager/beeper number. It is worthy to note that although a telephone is used to generate the IPTM message in this embodiment, it can be appreciated that a PC could be used as well and still fall within the scope of the invention.

As shown in FIG. 7(A), the originator dials a local IPTM telephone number at step 116. An IPTM server detects a telephone request at step 118. The IPTM server 16 initiates a voice prompted menu to complete the IPTM form over the telephone at step 120, described in more detail with reference to FIG. 13. At step 122, IPTM application module 32 sends back an acknowledgment and thank you message to the originator. At step 124, the IPTM message is packetized and sent via IP network 12 to a destination IPTM server 16 identified using TEMA.

Figure 7B:
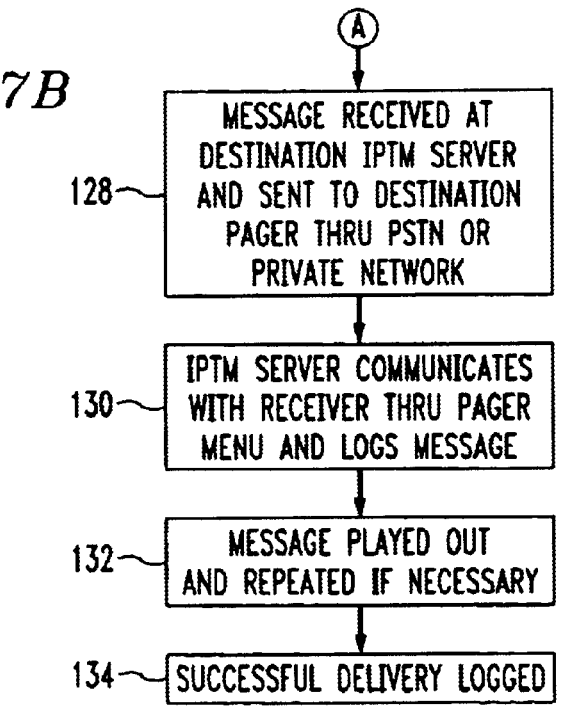
FIG. 7(B) is a second block flow diagram of a method for implementing IPTM in accordance with a third embodiment of the invention.

FIG. 7(B) is a second block flow diagram of a method for implementing IPTM in accordance with a third embodiment of the invention. As shown in FIG. 7(B), the IPTM message is received at the destination IPTM server 16 and sent to the destination pager number through the PSTN or private network at step 128. IPTM server 16 communicates with the recipient through a pager menu, and logs receipt of the IPTM message at step 130. At step 132, the message is displayed for the user. Once displayed, the message is logged as successfully delivered at step 134.

Figure 8A:
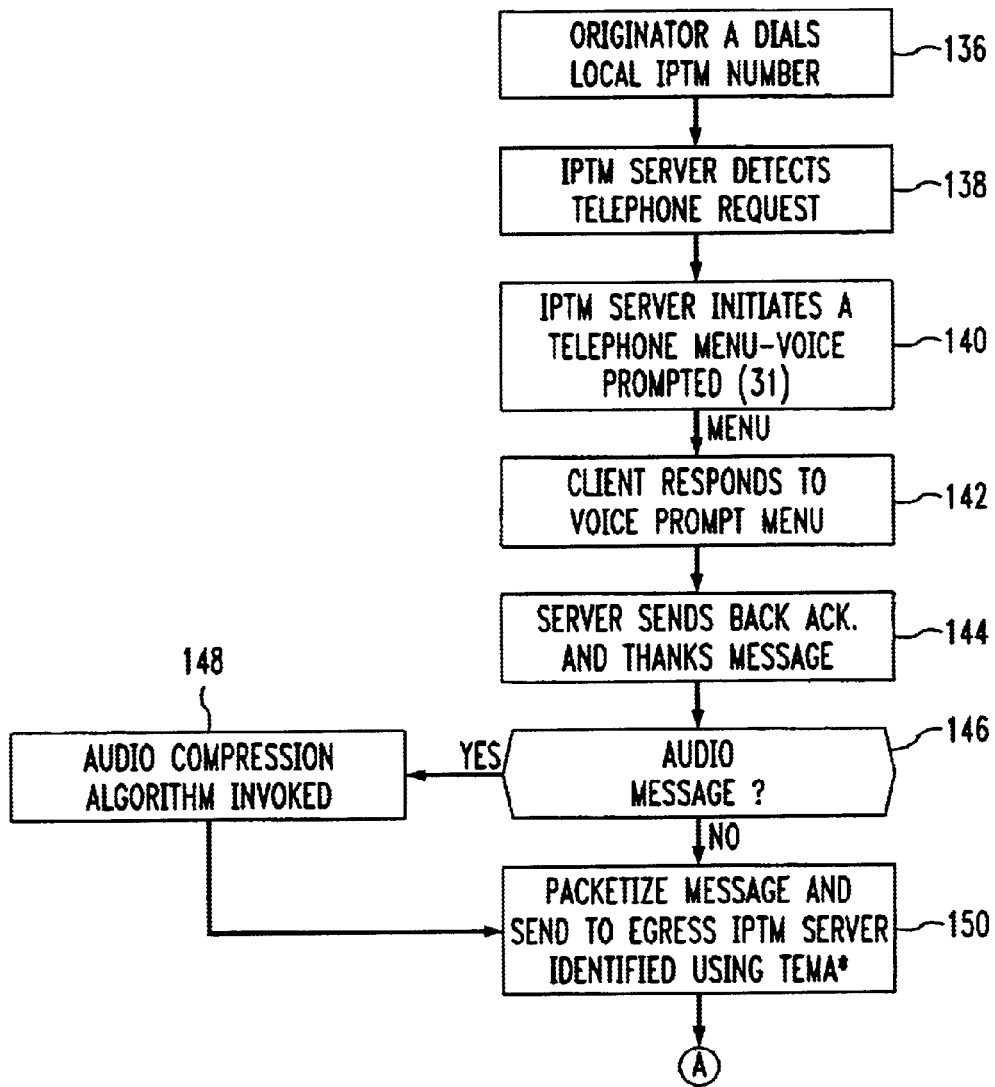
FIG. 8(A) is a first block flow diagram of a method for implementing IPTM in accordance with a fourth embodiment of the invention.

FIG. 8(A) is a first block flow diagram of a method for implementing IPTM in accordance with a fourth embodiment of the invention. This embodiment of the invention uses a telephone to generate the IPTM message for delivery to a PC via e-mail.

As shown in FIG. 8(A), the originator dials a local IPTM telephone number at step 136. An IPTM server detects a telephone request at step 138. The IPTM server 16 initiates a voice prompted menu to complete the IPTM form over the telephone at step 140, described in more detail with reference to FIG. 13. The originator generates an IPTM message by responding to the voice prompt menu at step 142. The originator is also given the option of recording a voice message for the recipient if desired. At step 144, IPTM application module 32 sends an acknowledgment and thank you message to the originator. Step 146 determines whether a voice message was recorded. If a voice message was recorded, then the voice message is compressed using any technique well-known in the art at step 148, and at step 150 a packetized message is sent via IP network 12 to a destination IPTM server identified using TEMA. If a voice message was not recorded, step 150 is executed directly.

Figure 8B:
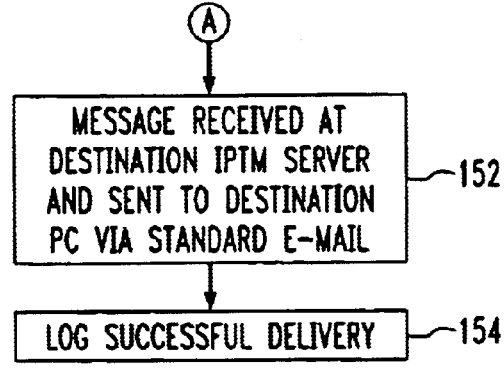
FIG. 8(B) is a second block flow diagram of a method for implementing IPTM in accordance with a fourth embodiment of the invention.

FIG. 8(B) is a second block flow diagram of a method for implementing IPTM in accordance with a fourth embodiment of the invention. At step 152, the IPTM message is received at a destination IPTM server 16 and sent to the destination PC for the recipient via standard e-mail. Once the e-mail message is delivered, the IPTM message is logged as successfully delivered at step 154.

Figure 9:
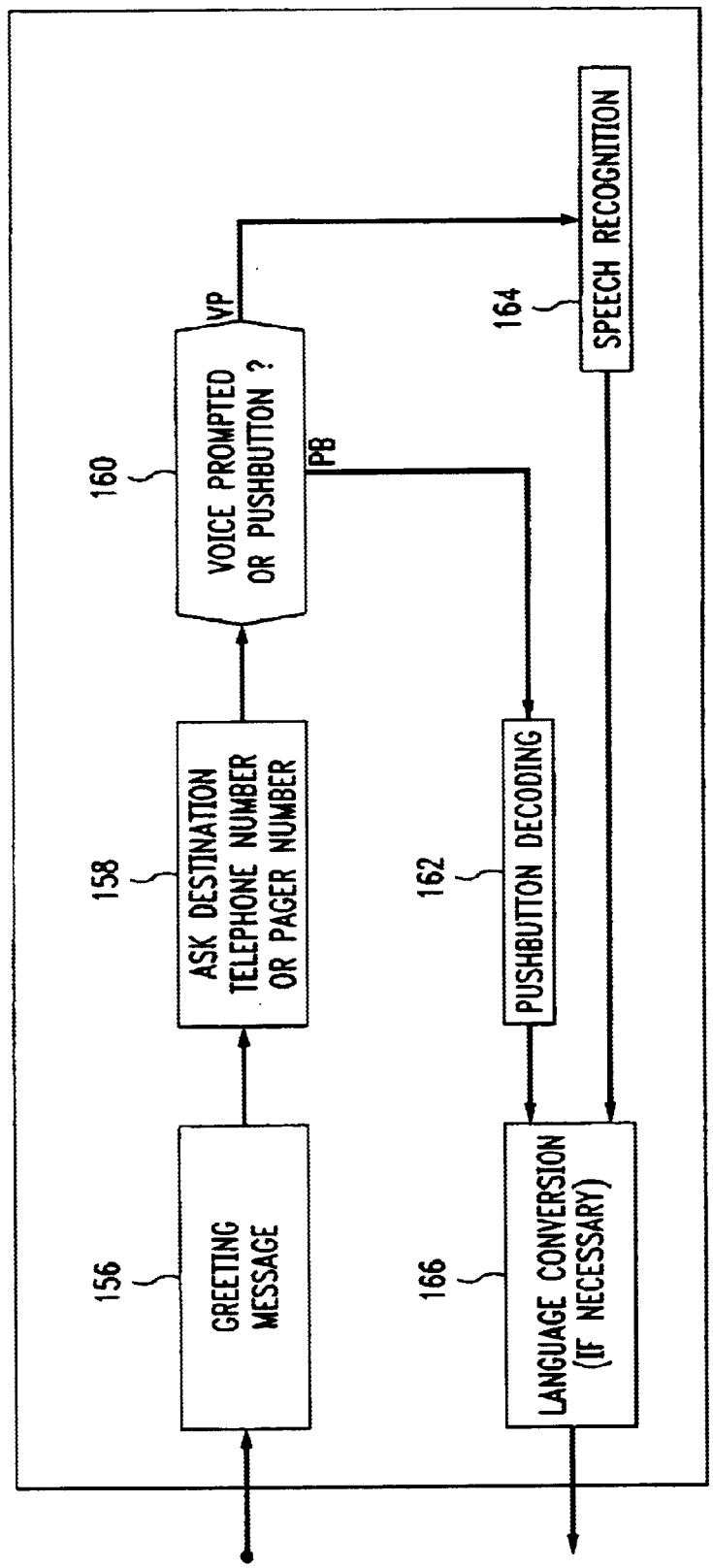
FIG. 9 is a block flow diagram of steps used for filling out an IPTM form using a telephone in accordance with one embodiment of the invention.

FIG. 9 is a block flow diagram of steps used for filling out an IPTM form using a telephone in accordance with one embodiment of the invention. As shown in FIG. 9, whenever an originator connects with an IPTM server using a telephone, a greeting message for IPTM services is played for the originator at step 156. At step 158 the originator is prompted as to enter a destination telephone number or pager number for a desired recipient. At step 160, the originator is asked whether he or she wants to complete IPTM form 41 using voice prompts or push button methods.

If the originator desires push button responses, the originator is asked a series of questions for completing IPTM form 41 and responds to the questions using the buttons found on a standard telephone keypad. Push button decoding module 36 is used to interpret the originator's responses to the various questions at step 162. For example, the "*" key could be used to delimit letters, and the "#" key could be used to delimit numbers. Rapid repeating of the same button denotes a desired letter, and could also move the letter, for example, the "*" key pressed twice erases the last character, and so forth. Thus, the originator could generate an IPTM message such as "call me at 11:30 AM" using the key sequence "* 222 2 555 555 6 33 #1130 *26." Once the IPTM message has been generated, language conversion occurs for the voice prompts if necessary at step 166.

If the originator desires to use voice responses at step 160, the originator is asked a series of questions for completing IPTM form 41 and responds to the questions using voice commands. The voice commands are interpreted using speech recognition module 28 at step 164. For example, when the originator is asked for the destination telephone number, the originator responds by speaking into the handset, for example, "1-908-555-1212." Once the IPTM message is completed, language conversion occurs for the voice prompts if necessary at step 166.

It is worthy to note that although the above described embodiments illustrate a single recipient or target device for the recipient, it can be appreciated that an IPTM message could be delivered to multiple target devices for a single recipient, or multiple recipients. This may be desirable, for example, when setting up a conference call.

Although a preferred embodiment is specifically illustrated and described herein, it will be appreciated that modifications and variations of the present invention are covered by the above teachings and within the purview of the appended claims without departing from the spirit and intended scope of the invention.

What is claimed is:

1. A method for telephony messaging, comprising the steps of:
   receiving a message at an origination PTM server from an originator for delivery to a target device for a recipient;
   storing said message at said origination PTM server;
   routing said message from said origination PTM server over a first network to a destination PTM server located near said target device;
   notifying said recipient of said message using a second network;
   delivering said message to said target device from said destination PTM server over said second network; wherein said originator and said recipient are bridged over said second network after said message has been delivered; and wherein said originator or said recipient requests said bridge.

2. The method of 1 wherein said message is created using a voice prompt menu with responses interpreted using push button decoding using a telephone.

3. The method of 1 wherein said recipient is notified of said message using a voice prompt menu with responses interpreted using push button decoding using a telephone.

4. An apparatus for telephony messaging, comprising:
   means for receiving a message at an origination PTM server from an originator for delivery to a target device for a recipient;
   means for storing said message at said origination PTM server;
   means for routing said message from said origination PTM server over a first network to a destination PTM server located near said target device;
   means for notifying said recipient of said message using a second network;
   means for delivering said message to said target device from said destination PTM server over said second network in response to a request by said recipient, wherein said originator and said recipient are bridged over said second network after said message has been delivered, and wherein said originator or said recipient requests said bridge.

5. The method of 4 wherein said recipient is notified of said message using a voice prompt menu with responses interpreted using push button decoding.

6. A system for telephony messaging using a packet-switched network, comprising:
   a first PTM server including:
     a PTM interface that receives message data from an originator for delivery to a target device;
     memory coupled to said PTM interface and that stores said message;
     a message router selecting a destination server based on the identity of the target device; and
     a packet network interface coupled to said memory, said message router, and the packet-switched network;
   a second PTM server, corresponding to said destination server and including:
     a packet network interface, coupled to the packet-switched network and receiving said message data from said packet network interface of said first PTM server;
     a second network interface; and
     a message signal indicator that notifies the recipient of said message data over a second network using said second network interface.

7. The system of 6, wherein said second PTM server includes a memory that stores said message data and wherein said second network interface is coupled to said memory of said second PTM server to transfer said message to the recipient over said second network.

8. The method of 4 wherein said message is created using a voice prompt menu with responses interpreted using push button decoding.

* * * * *